(12) United States Patent
Barillot et al.

(10) Patent No.: US 12,179,571 B2
(45) Date of Patent: Dec. 31, 2024

(54) ELECTRIC POWERTRAIN FOR A VEHICLE

(71) Applicant: VOLVO TRUCK CORPORATION, Gothenburg (SE)

(72) Inventors: Thomas Barillot, Mornant (FR); Jean Terrat, Malleval (FR); Vincent Brolles, Saint Laurent de Mure (FR); Grégory Bouteille, Genilac (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 313 days.

(21) Appl. No.: 17/660,104

(22) Filed: Apr. 21, 2022

(65) Prior Publication Data

US 2022/0339998 A1 Oct. 27, 2022

(30) Foreign Application Priority Data

Apr. 23, 2021 (EP) ..................... 21170165

(51) Int. Cl.
| | | |
|---|---|---|
| *B60K 1/02* | (2006.01) | |
| *B60K 6/48* | (2007.10) | |
| *B60K 17/08* | (2006.01) | |
| *B60K 17/16* | (2006.01) | |
| *B60K 25/02* | (2006.01) | |
| *B60K 25/00* | (2006.01) | |

(52) U.S. Cl.
CPC ............. *B60K 1/02* (2013.01); *B60K 6/48* (2013.01); *B60K 17/08* (2013.01); *B60K 17/16* (2013.01); *B60K 25/02* (2013.01); *B60K 2006/4825* (2013.01); *B60K 2025/005* (2013.01)

(58) Field of Classification Search
CPC . B60K 1/02; B60K 6/48; B60K 17/08; B60K 17/16; B60K 2006/4825
See application file for complete search history.

(56) References Cited

U.S. PATENT DOCUMENTS

| | | | |
|---|---|---|---|
| 11,331,997 B1 * | 5/2022 | Kim ................... | B60K 6/48 |
| 11,642,955 B1 * | 5/2023 | Hwang ................ | B60K 6/26 |
| | | | 475/151 |
| 2017/0096058 A1 * | 4/2017 | Kanada ............... | F16H 3/728 |
| 2018/0141426 A1 * | 5/2018 | Tsukizaki ........... | B60W 10/11 |
| 2019/0078672 A1 * | 3/2019 | Duan .................. | F16D 65/18 |
| 2019/0118638 A1 * | 4/2019 | Hummel .............. | B60K 6/387 |

(Continued)

FOREIGN PATENT DOCUMENTS

| | | |
|---|---|---|
| CN | 104633020 A | 5/2015 |
| CN | 103939535 B | 5/2016 |

(Continued)

OTHER PUBLICATIONS

European Search Report dated Oct. 2, 2021 in corresponding European Patent Application No. 21170165.1, 8 pages.

*Primary Examiner* — Erez Gurari

(74) *Attorney, Agent, or Firm* — Venable LLP; Jeffri A. Kaminski

(57) ABSTRACT

A kit of parts for configuring an electric powertrain for a vehicle, electric powertrains for a vehicle and a method for configuring an electric powertrain for a vehicle, the invention applies to an electric powertrain integrated into a vehicle axle. Such electric axle (or "E-axle") is a front or rear axle that includes an axle body (or "housing") adapted to receive a powertrain, which is arranged to provide torque to the wheels of the axle.

12 Claims, 10 Drawing Sheets

(56) References Cited

U.S. PATENT DOCUMENTS

| | | | |
|---|---|---|---|
| 2019/0308495 A1* | 10/2019 | Lian | B60K 6/485 |
| 2020/0189375 A1 | 6/2020 | Hayashi | |
| 2020/0240314 A1* | 7/2020 | Goto | F16H 57/0476 |
| 2020/0393039 A1* | 12/2020 | Matsui | F16H 57/03 |
| 2021/0252972 A1* | 8/2021 | Engerman | B60K 17/02 |
| 2021/0316608 A1* | 10/2021 | Marechal | B60K 17/08 |
| 2021/0331574 A1* | 10/2021 | Yang | B60K 6/442 |
| 2021/0347253 A1* | 11/2021 | Seemann | B60K 1/00 |
| 2021/0354543 A1* | 11/2021 | Lian | B60K 6/40 |
| 2022/0144073 A1* | 5/2022 | Beck | B60K 6/387 |
| 2022/0194204 A1* | 6/2022 | Hwang | B60K 6/365 |
| 2022/0266677 A1* | 8/2022 | Ito | B60K 1/02 |
| 2022/0324317 A1* | 10/2022 | Beck | B60K 6/365 |
| 2022/0339998 A1* | 10/2022 | Barillot | B60K 17/08 |
| 2024/0174079 A1* | 5/2024 | Zhao | F16H 3/10 |
| 2024/0253474 A1* | 8/2024 | Huber | B60L 15/2054 |

FOREIGN PATENT DOCUMENTS

| | | | |
|---|---|---|---|
| CN | 107878171 A | 4/2018 | |
| CN | 109677261 A | 4/2019 | |
| WO | 2018145231 A1 | 8/2018 | |
| WO | 2020025775 A1 | 2/2020 | |
| WO | 2020197463 A1 | 10/2020 | |
| WO | 2020256618 A1 | 12/2020 | |

* cited by examiner

| Combination | EM 1 | EM 2 | Cruise gear |
|---|---|---|---|
| 1 | Gear 1 | Neutral | Neutral |
| 2 | Neutral | Gear 2 | Neutral |
| 3 | Gear 3 | Neutral | Neutral |
| 4 | Neutral | Gear 4 | Neutral |
| 5 | Gear 1 | Gear 2 | Neutral |
| 6 | Gear 1 | Gear 4 | Neutral |
| 7 | Gear 3 | Gear 2 | Neutral |
| 8 | Gear 3 | Gear 4 | Neutral |
| 9 | Neutral | Neutral | Engaged |
| 10 | Neutral | Gear 4 | Engaged |
| 11 | Neutral | Gear 2 | Engaged |
| 12 | Neutral | Neutral | Neutral |

Fig. 17

ELECTRIC POWERTRAIN FOR A VEHICLE

TECHNICAL FIELD

The invention relates to kit of parts for configuring an electric powertrain for a vehicle, electric powertrains for a vehicle and a method for configuring an electric powertrain for a vehicle.

Typically, the invention applies to an electric powertrain integrated into a vehicle axle. Such electric axle (or "E-axle") is a front or rear axle that includes an axle body (or "housing") adapted to receive a powertrain, which is arranged to provide torque to the wheels of the axle. The "E-Axle" is a compact and economical electric drive solution for battery electric vehicles, fuel cells and hybrid applications. The electric motor(s), electronics and transmission are combined in a compact unit that directly drives the wheels provided at the longitudinal ends of the axle.

The invention can be applied in low-duty, medium-duty and heavy-duty vehicles, such as trucks, buses and construction equipment, as well as in passenger cars. Although the invention will be described with respect to a truck, the invention is not restricted to this particular vehicle type. Indeed, the electric powertrain of the invention could also be used in watercrafts (ships, boats, etc.).

BACKGROUND

The transport industry is currently in the process of transition to electro-mobility, which implies the use of electric power to drive vehicles. Electro-mobility is mainly developed to meet increasingly stringent emission regulation requirements and the banning of internal combustion engine vehicles by some cities.

In order to free as much space as possible for batteries, chassis and other large parts, such as aerodynamic profiles, the powertrain must be as compact as possible.

Most electric motors have an ideal operating range that is achieved at high speed and low torque, while internal combustion engines have an ideal operating range that is achieved at low speed and high torque. In order to meet the torque demand at the wheels, typically for hill starts or high load starts, a relatively high reduction ratio (usually between 20 and 50) between the electric motor and the wheels is required. This reduction ratio can only be achieved with several reduction stages, which requires space.

The problem with using a gearbox with a fixed speed ratio is that the electric motor would run at high speed and low torque in cruise mode conditions and that in such conditions, the efficiency of the motor is not optimal. In addition, high-speed conditions also increase stresses on the gears, bearings and sealing rings of the transmission, which reduces the durability of the transmission.

In addition, a gearbox with gears rotating at high speed also creates lubrication problems. Indeed, a gear rotating too fast may not be lubricated properly since the oil between two successive teeth is ejected by centrifugal force and metal-to-metal contact may occur between the teeth of the two gears in mesh, which generates heat and, consequently, potentially irreversible mechanical damage.

High rotation speed is also generally creating more noise and vibrations. This can be problematic from regulation perspectives and for customers (both drivers and persons outside the vehicle).

Additionally, the conventional electric powertrain cannot be adapted to a wide range of vehicle including low-duty vehicles, medium-duty vehicles and heavy-duty vehicles. Thus, vehicles manufacturers have to develop and/or supply themselves with a wide range of electric powertrains, each powertrain corresponding to one kind of vehicle. The production cost is therefore significantly high and the manufacturing method is not optimized.

It is to these disadvantages that the invention aims more particularly to remedy, by proposing a more compact and robust electric powertrain, and making it possible to ensure a better efficiency of the electric motor in many conditions by offering several gear ratios. Additionally, the invention aims to provide a modular electric powertrain that can be easily adapt on a wide range of vehicles. In other words, the invention aims to provide an electric powertrain of which the architecture can be easily adapt depending on the kind of vehicle to manufacture.

SUMMARY

By the provision of a kit of parts for configuring an electric powertrain for a vehicle according to the present invention, the advantage is to provide modular and compact electric powertrains depending on the vehicle needs. Thus, the architecture of the electric powertrain is adapted to one kind of vehicle, in particular to the vehicle load, the vehicle architecture, the vehicle topography, the customers' expectations and the vehicle application. The vehicles manufacturers can therefore supply with all the constituents of the kit of parts and select the constituents needed for manufacturing one vehicle. Furthermore, the architecture of the electric powertrains according to the present invention is compact and offers a better efficiency. Consequently, the kit-of-parts and the electric powertrains according to the present invention allow for an optimized manufacturing method, a reduction of the production costs, an increased productivity and a better efficiency.

Thanks to the architecture of the third gear module, the electric powertrain according to the present invention is more compact allowing a mass saving and an optimized architecture. The electric powertrain can therefore be implemented in a wide range of vehicles. Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 16 is a schematic representation of the electric powertrain according to the fourth embodiment and FIG. 17 is a table summarizing all possible operating modes of the powertrain that is part of the E-axle.

DETAILED DESCRIPTION OF EXAMPLE EMBODIMENTS OF THE INVENTION

The present description is given in an X,Y,Z referential where X is defined as the longitudinal direction of the vehicle 1, Y is defined as the transversal direction and Z is defined as the vertical direction of the vehicle 1.

Figure 1:
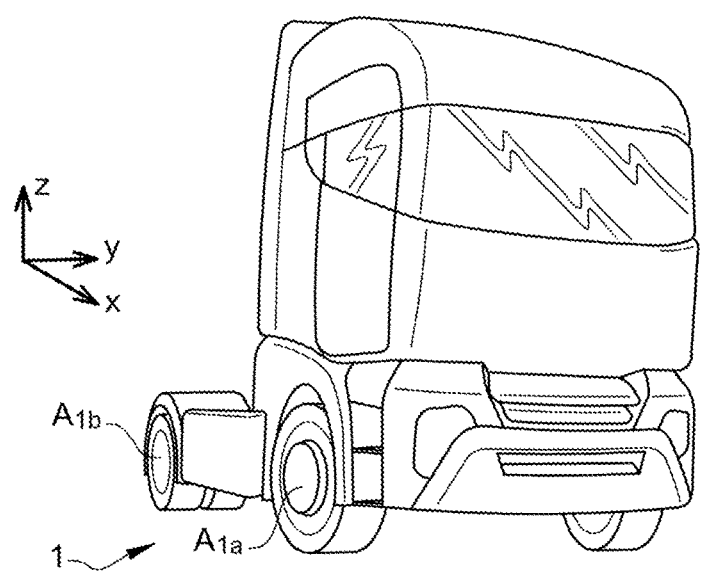
FIG. 1 is a perspective view of a vehicle, comprising an electric powertrain according to the invention, said powertrain being integrated into one of the axles of the vehicle, called "E-axle"

FIG. 1 shows a vehicle, which is an electric, fuel cell or hybrid vehicle, i.e. a vehicle using electric energy as a source of power. In the example, the vehicle is a truck 1, comprising two axles $A_{1a}$ and $A_{1b}$, respectively a front axle $A_{1a}$ and a rear axle $A_{1b}$.

In an alternative embodiment, the vehicle may include one or more additional front and/or rear axle(s). Each axle can alternatively be none driven or driven axle(s).

At least one of the two axles $A_{1a}$ and $A_{1b}$ is motorized, i.e. includes at least one electric motor. In the example, we consider that only the rear axle $A_{1b}$ is motorized, i.e. vehicle 1 is a propulsion vehicle (in which only the rear axle(s) is/are motorized). However, the invention obviously also applies to all-wheel drive vehicles and to traction vehicles (in which only the front axle(s) is/are motorized).

Axle $A_{1b}$ includes a powertrain 7, 7a, 7b, comprising a first electric motor (or "E-motor") EM1, a first and a second electric motor EM1, EM2 or a second electric motor EM2. In the example, the two motors EM1 and EM2 are identical in that they have the same characteristics (supply voltage, operating current, torque-speed characteristic, mechanical power, etc.). For example, the mechanical power of EM1 and EM2 are between 50 kW to 500 kw. Alternatively, the two motors EM1 and EM2 can be different.

Advantageously, the electric motors EM1 and EM2 are AC type motors (synchronous or asynchronous). Alternatively, the electric motors EM1 and EM2 could be DC type motors as well (brushed). More generally, any electric motor is suitable.

Figure 2:
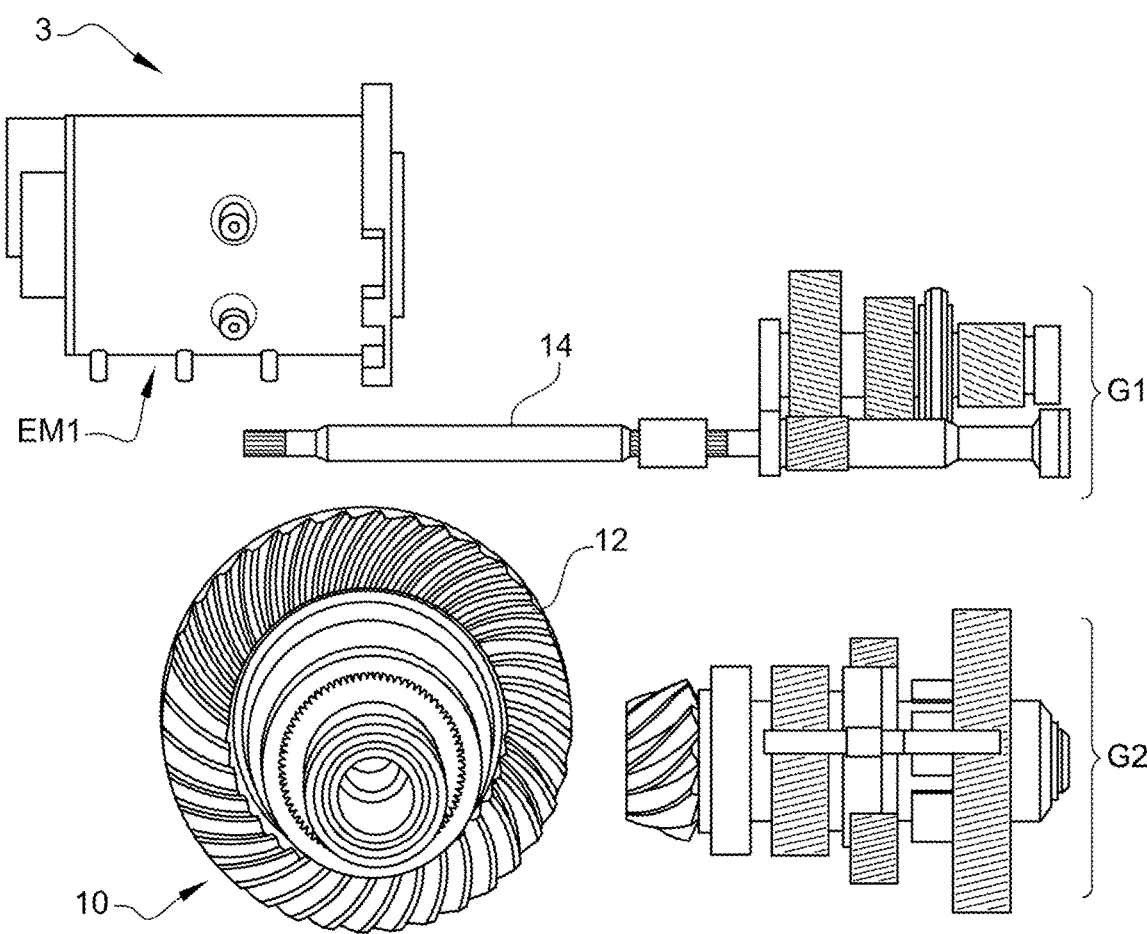
FIG. 2 is a view of the kit-of-parts for configuring an electric powertrain integrated to the E-axle, said powertrain comprising a transmission unit including a first electric motor according to a first embodiment of the invention.
Figure 3:
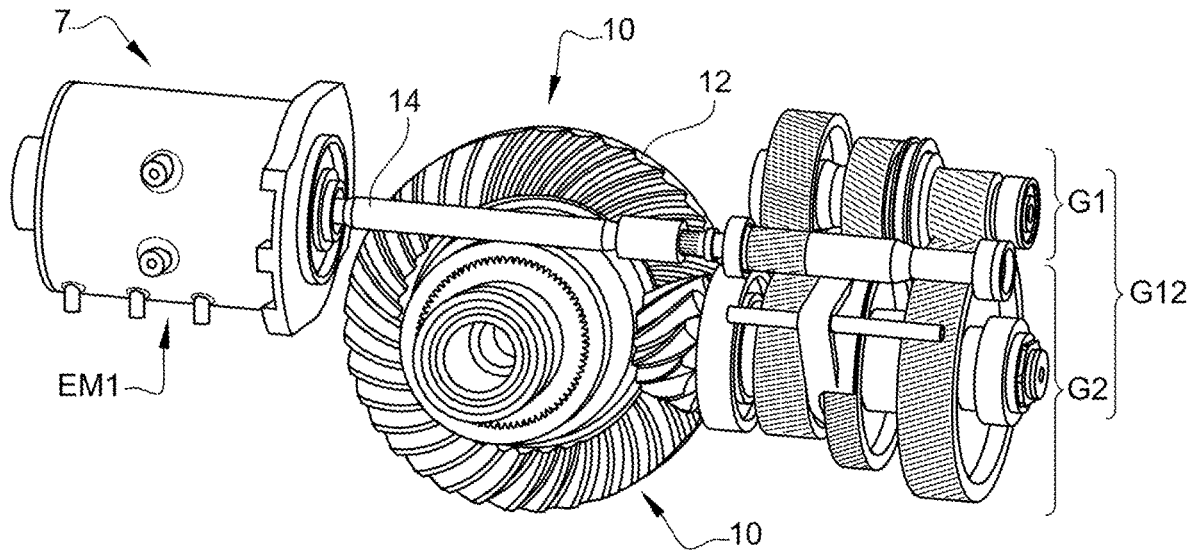
FIG. 3 is a perspective view of the electric powertrain integrated to the E-axle, said powertrain being according to the first embodiment of the invention.

As shown on FIG. 2, in a first embodiment, the invention relates to a kit of parts 3 for configuring an electric powertrain 7 for a vehicle 1 as illustrated in FIGS. 3 to 7. The kit of parts 3 comprises a first primary gear 31, a second primary gear 32 and a third primary gear 33 suitable to be arranged on a primary shaft 34 to obtain a first gear module G1 and a first electric motor EM1 suitable to be linked to the first gear module G1.

The kit of parts 3 further comprises a first secondary gear 41 for meshing with the first primary gear 31, a second secondary gear 42 for meshing with the second primary gear 32, a third secondary gear 43 for meshing with the third primary gear 33; said first secondary gear 41, second secondary gear 42 and third secondary gear 43 being suitable to be arranged on a secondary shaft 44, also called "output shaft", to obtain a second gear module G2.

The first gear module G1 is arranged in a first gear casing (not shown) and the second gear module G2 is arranged in a second gear casing (not shown), said first gear casing and the second gear casing being adjacent. The first gear module G1 and the second gear module G2 are arranged to obtain a gearbox G12. In this electric powertrain 7, the first secondary gear 41 is by default free to rotate around the secondary shaft 44. In an alternative embodiment, the first gear module G1 and the second gear module G2 are arranged in a common gear casing (not shown).

In this electric powertrain 7, the primary first primary gear 31 is fixed in rotation with respect to the primary shaft 34, the second primary gear 32 and a third primary gear 33. The primary first primary gear 31, the second primary gear 32 and a third primary gear 33 have each a different (outer diameter) and/or a different number of teeth. Typically, the primary first primary gear 31 has a diameter which is greater than that of the second primary gear 32 and the second primary gear 32 has a diameter that is greater than that of the third primary gear 33.

In the example, the first primary gear 31 is integral with shaft 34 (i.e. made in one-piece). However, the first primary gear 31 could be fixedly attached to shaft 34 as well, using fasteners, welding, splines or any other means. Besides, the second primary gear 32 and the third primary gear 33 are, in this particular arrangement, by default each free to rotate around primary shaft 34.

The kit of parts 3 further comprises a differential 10 to be connected to EM1. When configuring the electric powertrain 7, for example, the axle A1b has an elongated transmission housing (not shown). This transmission housing includes a central part receiving the differential 10 and two lateral parts extending on either side of the central part. The two lateral parts receive the two output shafts 61 and 62 respectively connected to the wheels W1 and W2 (See FIG. 7). The electric motor EM1 is arranged so as to transmit a driving torque (or motor torque) to the wheel shafts 61, 62 via the crown wheel 12 of the differential 10.

In this embodiment, EM1, the differential 10 and the gearbox G12 are arranged to obtain a transmission unit. The gearbox G12 includes a multiple speed ratio.

Typically, the motor EM1 is attached to the transmission housing by any appropriate means and in particular by bolting. Such fastening means are known as such, that is why they are not shown on the figures. Alternatively, the housing of the electric motor EM1 is integral with the transmission housing.

Advantageously, the first electric motor EM1 is offset from a longitudinal direction of the vehicle.

Preferably, the axis of rotation of electric motor EM1 is parallel to the longitudinal direction of the vehicle. Accordingly, the powertrain 7 is said to be in a longitudinal configuration relative to the axle.

The gearbox G12 also includes a first coupling member 40 (also known as "gear shifting mechanism" or "dog clutch element"), which is arranged along the secondary shaft 44 and which can be moved between an engaged position, in which it couples the first secondary gear 41 in rotation with the secondary shaft 44 and a neutral position, in which it allows the first secondary gear 41 to rotate freely around the secondary shaft 44.

The gearbox G12 also includes a second coupling member 18, which is arranged along one shaft among the primary and secondary shafts 34, 44, typically along shaft 34, and which is movable between a first position in which it couples the second primary gear 32 in rotation with primary shaft 34, a second position in which it couples the third primary gear 33 in rotation with primary shaft 34 and a neutral position in which it does not prevent the second and third primary gears 32, 33 from rotating around primary shaft 34.

In one alternative embodiment, the second coupling member 18 could be arranged along the secondary shaft 44. In this case, the second coupling member 18 would be movable between a first position in which it would couple the second secondary gear 42 in rotation with secondary shaft 44, a second position in which it would couple the third secondary gear 43 in rotation with secondary shaft 44 and a neutral position in which it would not prevent the second and third secondary gears 42, 43 from rotating around secondary shaft 44.

Preferably, at least one of the first coupling member 40 and the second coupling member 18 (preferably both coupling members 18 and 40) is a dog clutch.

Advantageously, a first speed ratio ("EM1 gear 1") is obtained when the first coupling member 40 is in neutral position and when the second coupling member 18 is in the second position. In this configuration, the torque is transmitted from the primary shaft 34 to the secondary shaft 44 through the pair of gears 33 and 43. The other gears, i.e. gears 33 and 41, are respectively unclutched from shafts 34 and 44. This means that the rotation speed of gear 33 is independent from that of shaft 34 and that the rotation speed of gear 41 is independent from that of shaft 44. In other words, gears 33 and 41 are free to rotate around shaft 34 and 44, respectively. Nevertheless, it does not mean that gears 33 and 41 remain immobile: Gears 33 and 41 are respectively rotationally driven by gears 43 and 31, which are each fixed in rotation with shaft 44 and 34, respectively.

Advantageously, a second speed ratio ("EM2 gear 3"), different from the first speed ratio, is obtained when the first coupling member 40 is in neutral position and when the coupling member 18 is in first position. In this configuration, the torque is transmitted from the primary shaft 34 to the secondary shaft 44 through the pair of gears 32 and 42. The other gears, i.e. gears 32 and 41, are respectively unclutched from shafts 34 and 44. This means that the rotation speed of gear 32 is independent from that of shaft 34 and that the rotation speed of gear 41 is independent from that of shaft 44. In other words, gears 32 and 41 are free to rotate around shaft 34 and 44, respectively. Nevertheless, it does not mean that gears 32 and 41 remain immobile: Gears 32 and 41 are respectively rotationally driven by gears 42 and 31, which are each fixed in rotation with shaft 34 and 44, respectively.

Advantageously, a third speed ratio ("EM1 cruise gear"), different from the first two speed ratios, is obtained when the first coupling member 40 is in the engaged position and the second coupling member 18 is in the neutral position. In this configuration, the torque is transmitted from the primary shaft 34 to the secondary shaft 44 through the pair of gears 31 and 41. The other gears, i.e. gears 32 and 33, are unclutched from shaft 34. This means that the rotation speeds of gears 32 and 33 are independent from the rotation speed of the shaft 34. In other words, gears 32 and 33 are free to rotate around shaft 34. Nevertheless, it does not mean that gears 32 and 33 remain immobile: Gears 32 and 33 are respectively rotationally driven by gears 42 and 43, which are fixed in rotation with shaft 44.

The speed ratio of gearbox G12 can be defined as the quotient between the rotational speed of the output gear 46 and the rotational speed of gear 16. The first speed ratio is lower than the second speed ratio, which is, itself, lower than the third speed ratio (cruise gear ratio). Typically, the first speed ratio is about 1:16, the second speed ratio is about 1:10 and the third speed ratio is about 1:7.

Typically, the first speed ratio can be selected at low speeds, i.e. at vehicle start, the second speed ratio can be selected at medium speeds and the third speed ratio can be selected at high speeds. It is to be understood that the transmission ratio of the gearbox G12 is automatically modified according to the vehicle speed.

In addition, if both coupling members 18 and 40 are put in neutral position, then no torque will be transmitted by the electric motor EM1 to the wheels.

In the example, the gearbox G12 therefore has at least three different speed ratios (three-speed gearbox). It is to be noted that only three gears are arranged on the primary shaft 34 of the gearbox G12, which is uncommon for a three-speed gearbox: Indeed, a three-speed gearbox usually includes an input shaft on which are arranged one input gear (to be connected to the driving source) and three distribution gears of different diameter to achieve the three speed ratios, i.e. fourth gears. This enables having a very compact gearbox, in particular in the longitudinal direction of the transmission.

In one alternative embodiment, the second and third secondary gears 42, 43 arranged along the secondary shaft 44 are by default each free to rotate around said secondary shaft 44. In this case, a third coupling member would be arranged along secondary shaft 44 and would be movable between a first position in which it would couple the second gear 42 in rotation with secondary shaft 44, a second position in which it would couple the third gear 43 in rotation with secondary shaft 44 and a neutral position in which the second and third gears 42, 43 can rotate around the secondary shaft 44. The advantage of having a third coupling member is that there is no need to lubricate the gear set 32, 42 or 33, 43 when it does not transmit any torque and that it limits oil churning and friction losses. This also reduces wear on the gears teeth, making the gearbox G12 more robust (or more durable).

Indeed, the third coupling member would allow to use only the pair of gears that transmit the torque (32 and 42 for instance) and to avoid that the other gears (33 and 43 for instance), which do not transmit any torque, rotate. When the second coupling member 18 is in neutral position, the third coupling member could also be put to neutral, so that none of the gears 32, 42, 33 and 43 would rotate.

In the particular embodiment of the figures, the first electric motor EM1 comprises a motor shaft (or "rotor shaft") 14 on which is arranged a pinion 16 meshing with the first primary gear 31 of the primary shaft 34.

Typically, pinion 16 is fixed in rotation with motor shaft 14. For example, pinion 16 can be integral with shaft 14, meaning that pinion 16 and shaft 14 form a unique part.

Figure 4:
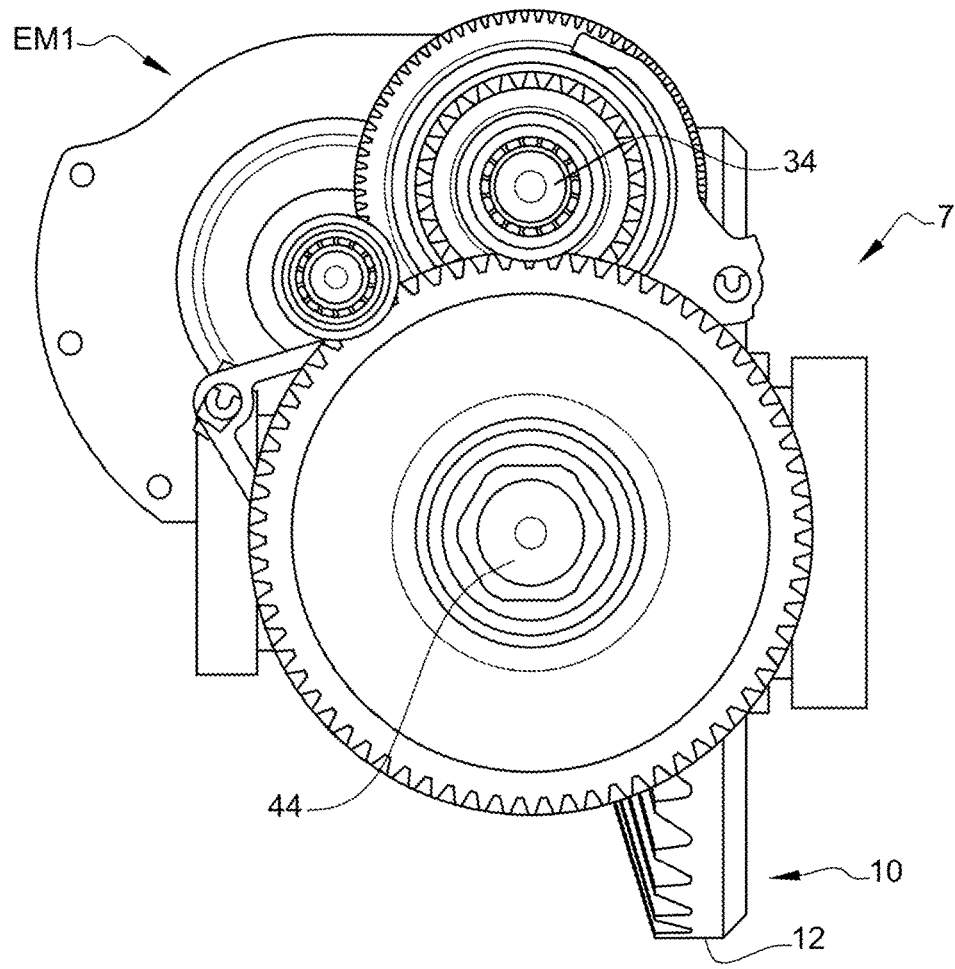
FIG. 4 is a front view of the powertrain integrated to the E-axle, said powertrain having a first architecture according to a first embodiment of the invention.
Figure 5:
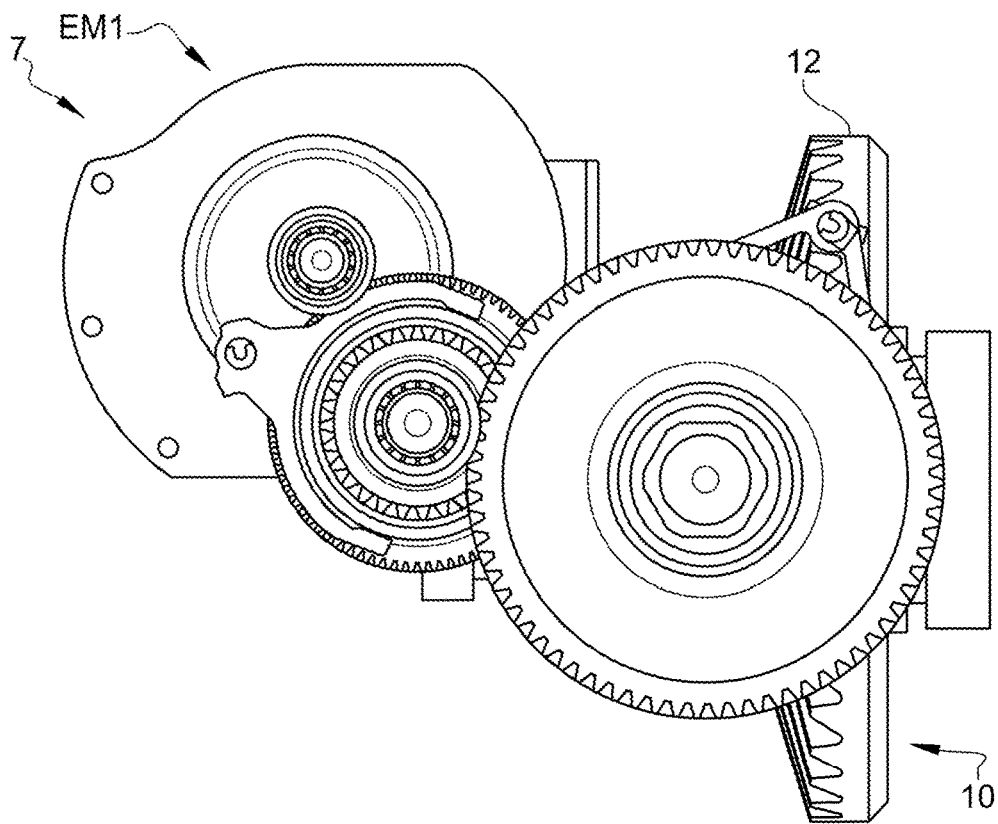
FIG. 5 is a front view of the powertrain integrated to the E-axle, said powertrain having a second architecture according to a first embodiment of the invention.
Figure 6:
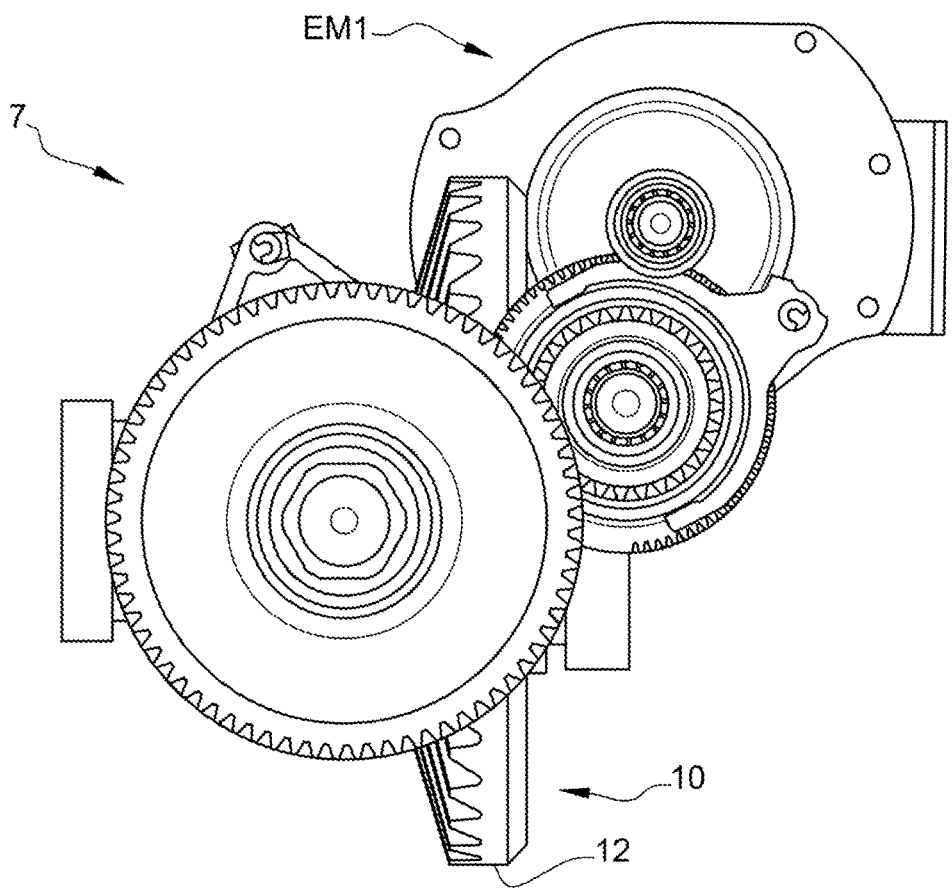
FIG. 6 is a front view of the powertrain integrated to the E-axle, said powertrain having a third architecture according to a first embodiment of the invention.
Figure 7:
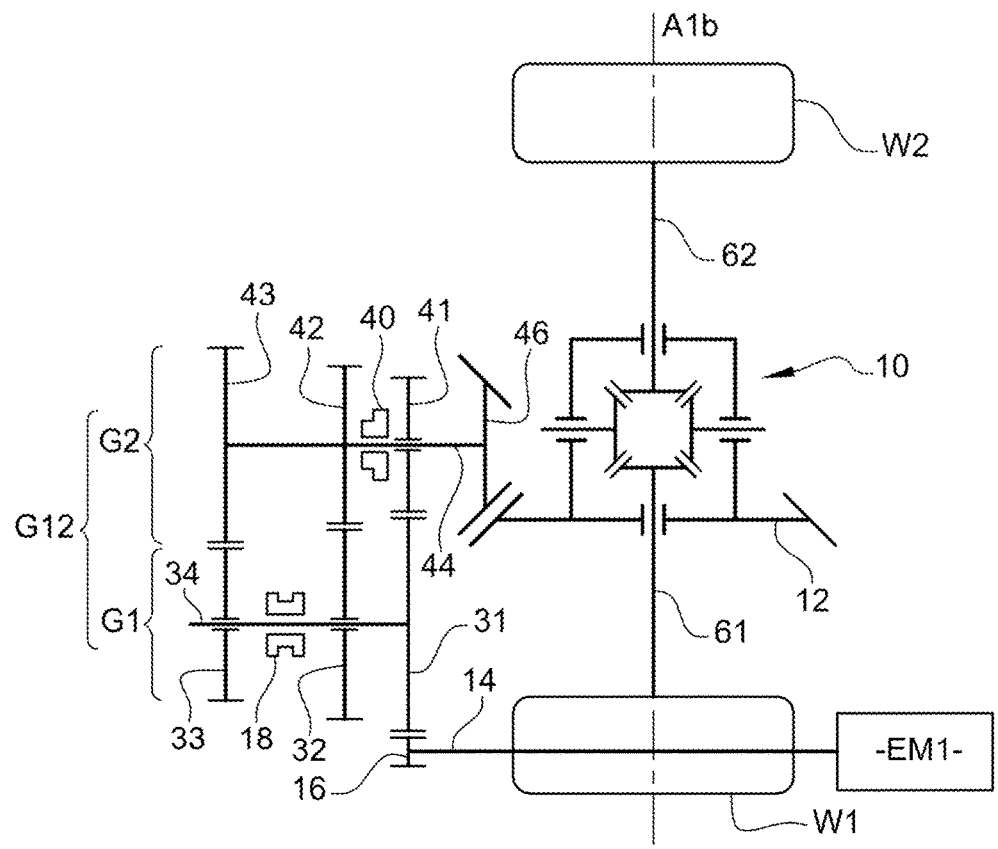
FIG. 7 is a schematic representation of the electric powertrain according to the first embodiment.
Figure 8:
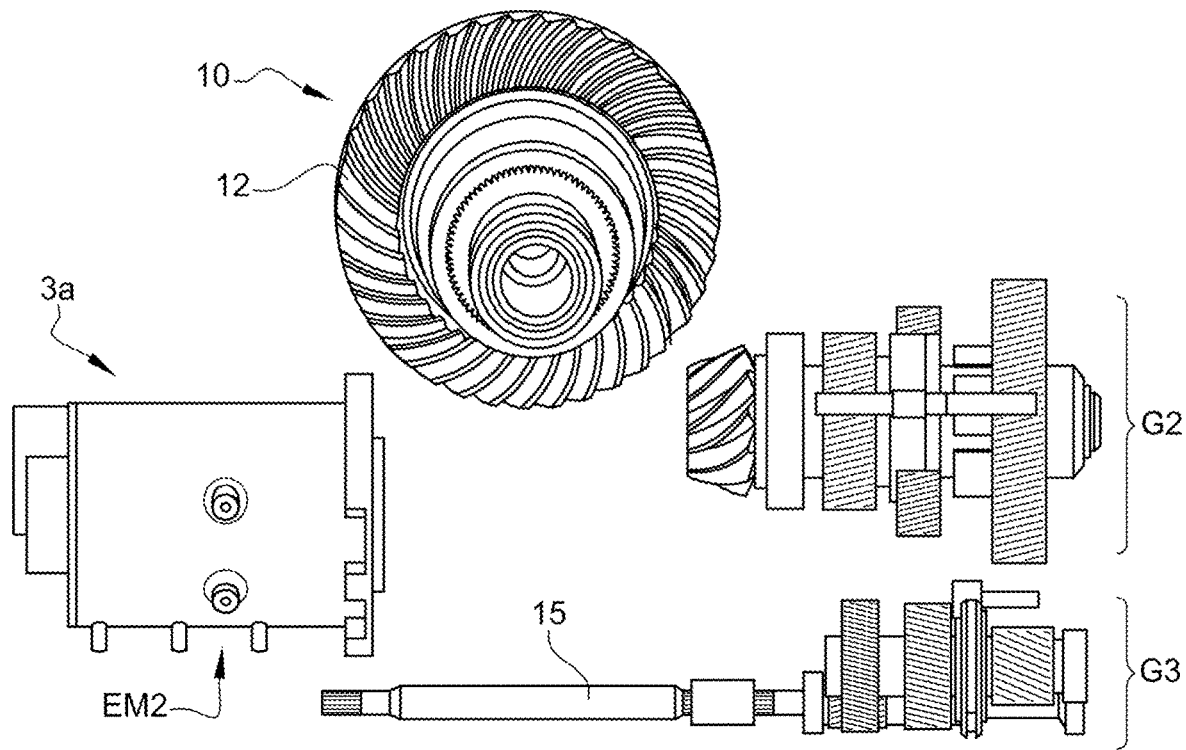
FIG. 8 is a view of the kit-of-parts for configuring an electric powertrain integrated to the E-axle, said powertrain comprising a transmission unit including a second electric motor according to a second embodiment of the invention.
Figure 9:
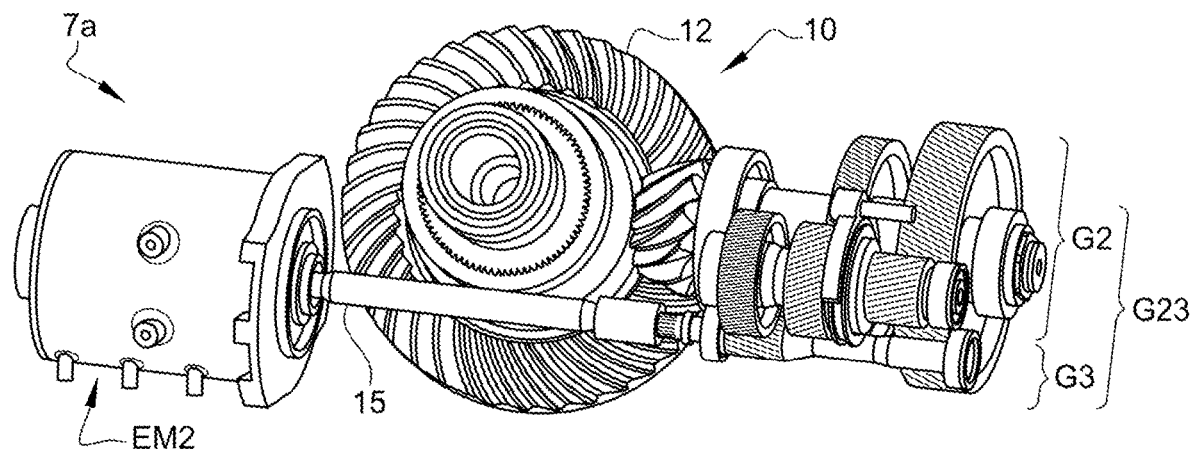
FIG. 9 is a perspective view of the electric powertrain integrated to the E-axle, said powertrain being according to the second embodiment of the invention.
Figure 10:
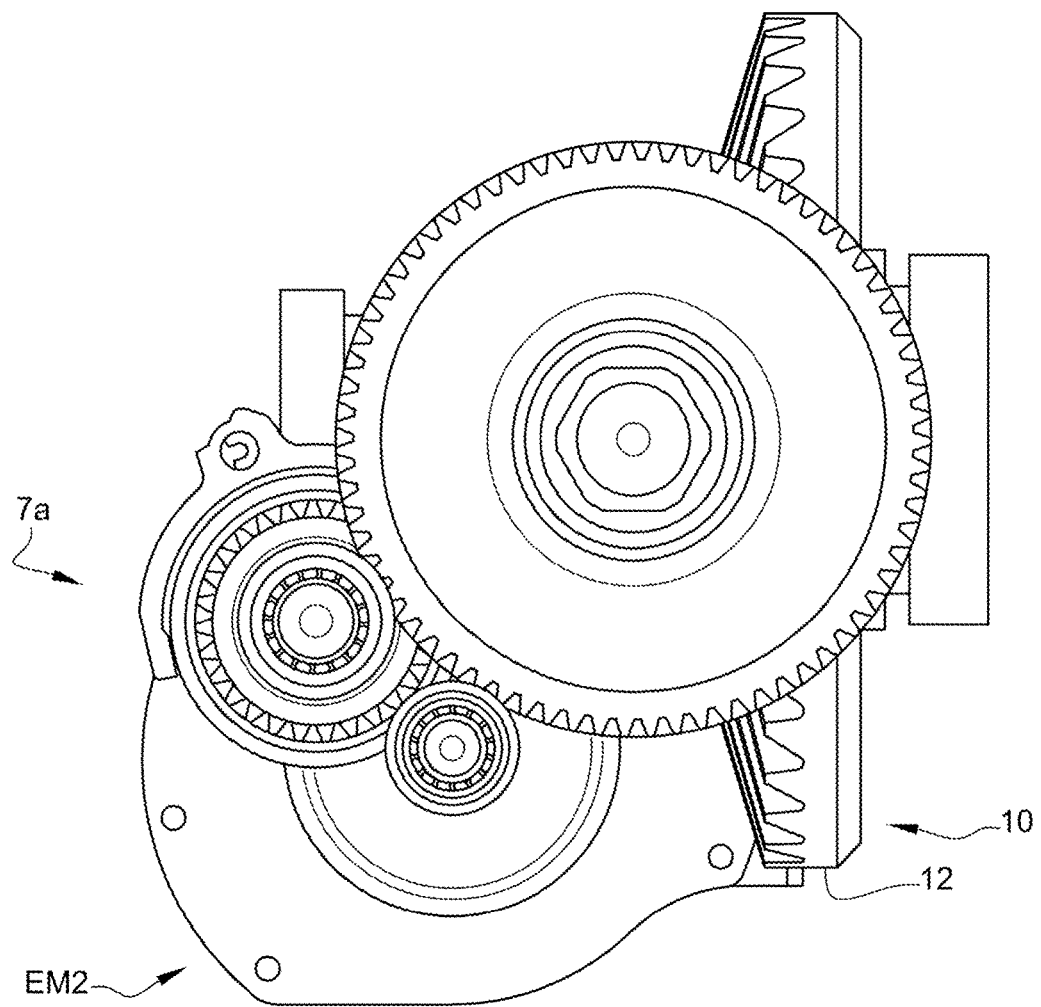
FIG. 10 is a front view of the powertrain integrated to the E-axle, said powertrain being according to the second embodiment of the invention.
Figure 11:
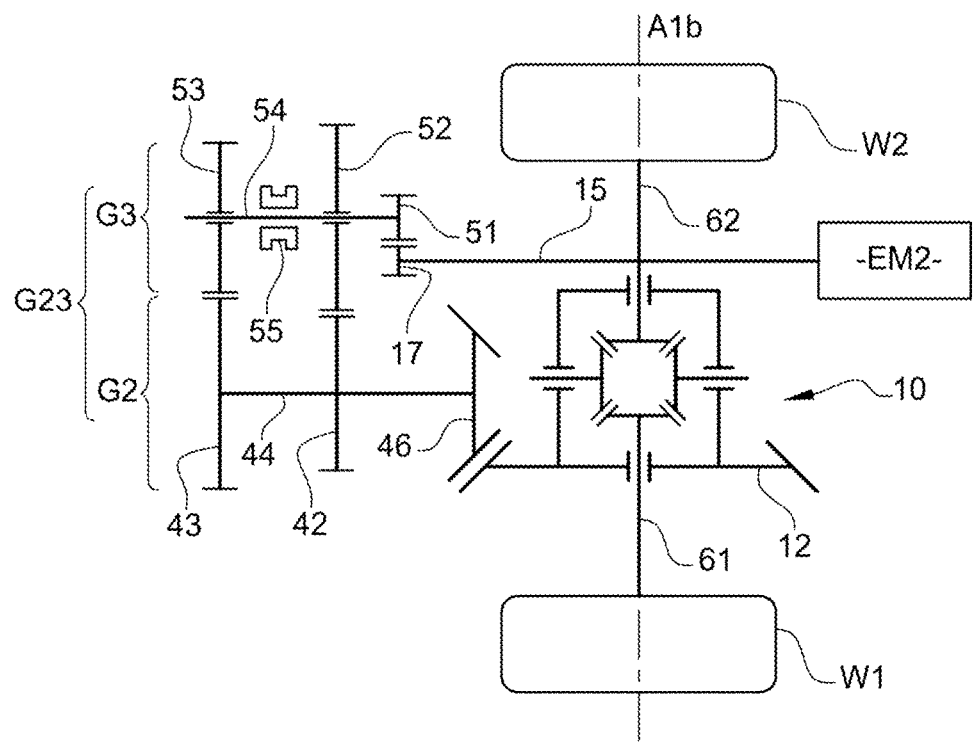
FIG. 11 is a schematic representation of the electric powertrain according to the second embodiment.

FIGS. 4 to 6 show different examples of an electric powertrain 7 being configured according to different architectures. The kit of parts of the present invention allows to adapt the architecture of the electric powertrain depending on the vehicle. Indeed gear 16 can mesh into gear 31 at any 360° angular position around gear 31 and gears 31, 32 and 33 can mesh into gears 41, 42 and 43 at any 360° angular position around shaft 44. This assembly freedom in the architecture so called "clocking" allows kit of parts of the present invention to adapt the architecture of the electric powertrain depending on the vehicle. As shown on FIG. 8, in a second embodiment, the invention relates to a kit of parts 3a for configuring an electric powertrain 7a for a vehicle 1 as illustrated in FIGS. 9 to 11. The kit of parts 3a for configuring an electric powertrain 7a for a vehicle 1 comprises a first tertiary gear 51, configured to be fixed in rotation with respect to the tertiary shaft 54, a second tertiary gear 52 and a third tertiary gear 53 are arranged on the tertiary shaft 54. The first tertiary gear 51, the second tertiary gear 52 and the third tertiary gear 53 are arranged adjacent on the tertiary shaft 54 to obtain a third gear module G3. In the example, the second tertiary gear 52 and a third tertiary gear 53 are by default free to rotate around the tertiary shaft 54.

The second tertiary gear 52 meshes with the second secondary gear 42 fitted on secondary shaft 44 and the third input gear 53 meshes with the third secondary gear 43. Contrary to the configuration of the first gearbox G12, the first input gear 51 does not mesh with any secondary gear, in particular with the first secondary gear 41. Indeed, the first secondary gear 41 is not present on the secondary shaft 44.

In the particular embodiment of the figures, the second electric motor EM2 comprises a motor shaft 15 on which is arranged a pinion 17 meshing with the first tertiary gear 51 of the tertiary shaft 54. The motor shaft 15 and the secondary shaft 44 extend parallel to each other. The second gear module G2 is arranged in a second gear casing (not shown) and the third gear module G3 is arranged in a third gear casing (not shown), the second and the third gear casings being adjacent. The second gear module G2 and the third gear module G3 are included in a gearbox G23. In an alternative embodiment, the first gear module G1 and the second gear module G2 are arranged in a common gear casing (not shown).

In this embodiment, EM2, the differential 10 and the gearbox G23 are arranged to obtain a transmission unit.

Typically, the motor EM2 is attached to the transmission housing by any appropriate means and in particular by bolting. Such fastening means are known as such, that is why they are not shown on the figures. Alternatively, the housing of the electric motor EM2 is integral with the transmission housing.

Advantageously, the first electric motor EM2 is offset from a longitudinal central direction of the vehicle.

Preferably, the axis of rotation of electric motor EM2 is parallel to the longitudinal central direction of vehicle. Accordingly, the powertrain 7a is said to be in a longitudinal configuration relative to the axle.

Gearbox G23 can include a coupling member 55 fitted on the input shaft 54, typically between the second and the third tertiary gears 52 and 53. The coupling member 55 is movable between a first position in which it couples the second tertiary gear 52 in rotation with tertiary shaft 54, a second position in which it couples the third tertiary gear 53 in rotation with tertiary shaft 54 and a neutral position in which it allows the second and third tertiary gears 52, 53 to rotate freely around the tertiary shaft 54.

Advantageously, a first speed ratio ("EM2 gear 2") is obtained when the coupling member 55 is in the first position. In this configuration, the torque is transmitted from the shaft 54 to the secondary shaft 44 through the pair of gears 53 and 43. This means that the rotation speed of gear 53 is independent from that of shaft 54. In other words, gear 53 is free to rotate around shaft 54. Nevertheless, it does not mean that gears 53 remains stationary. Gear 53 is rotationally driven by gear 43, which is fixed in rotation with shaft 44.

Advantageously, a second speed ratio ("EM2 gear 4") is obtained when the coupling member 55 is in the second position. In this configuration, the torque is transmitted from the shaft 54 to the secondary shaft 44 through the pair of gears 52 and 42. This means that the rotation speed of gear 52 is independent from that of shaft 54. In other words, gear 52 is free to rotate around shaft 54. Nevertheless, it does not mean that gear 52 remains immobile. Gear 52 is rotationally driven by gear 42 which is fixed in rotation with shaft 44.

Besides, a neutral point can be obtained when both coupling members 40 and 55 are each in neutral position.

The speed ratio of gearbox G23 can be defined as the quotient between the rotational speed of the output gear 46 and the rotational speed of gear 17. Preferably, the first speed ratio of gearbox G23, which is about 1:10 is lower than the second speed ratio of gearbox G23, which is about 1:5. It is to be understood that gear shifting within the gearbox G23 is automatically achieved according to the vehicle speed.

Gearbox G23 is a two-speed gearbox, with a neutral point, in which no torque can be transmitted from the electric motor EM2 to the wheels W1 and W2.

Figure 12:
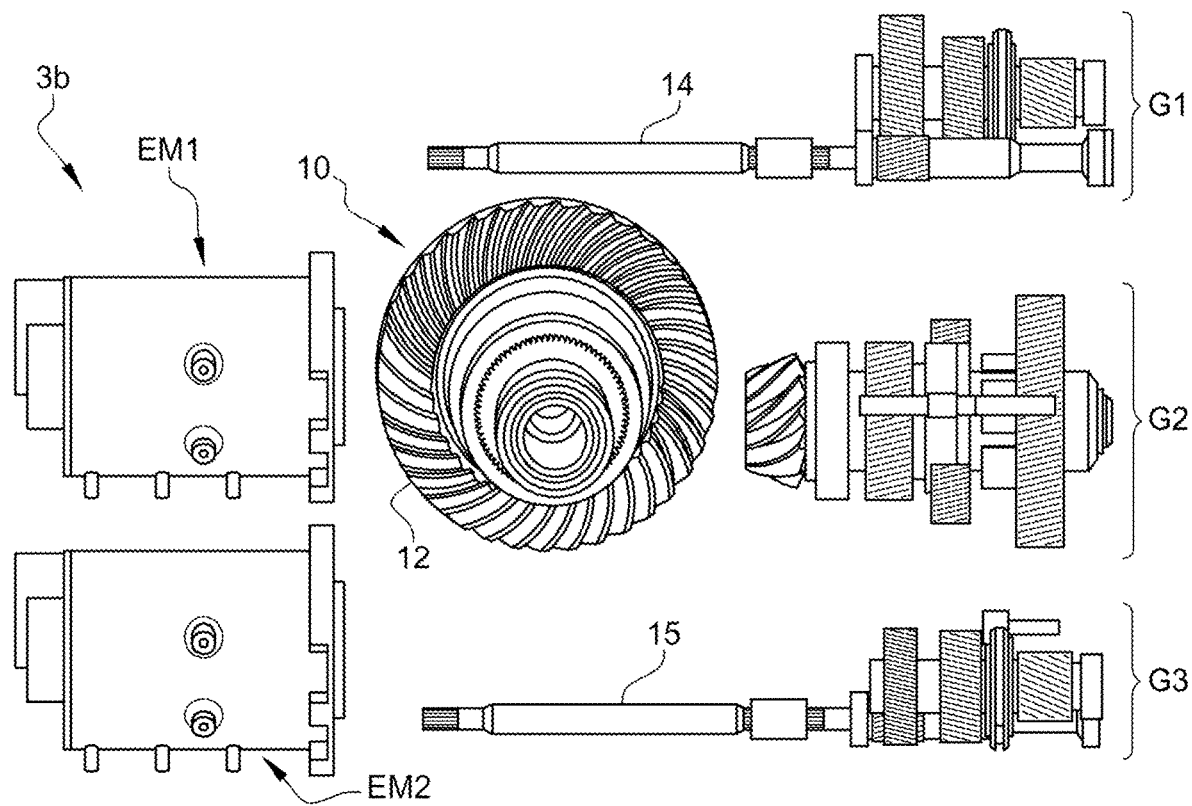
FIG. 12 is a view of the kit-of-parts for configuring an electric powertrain integrated to the E-axle, said powertrain comprising a transmission unit including a first and a second electric motors according to a third embodiment of the invention.
Figure 13:
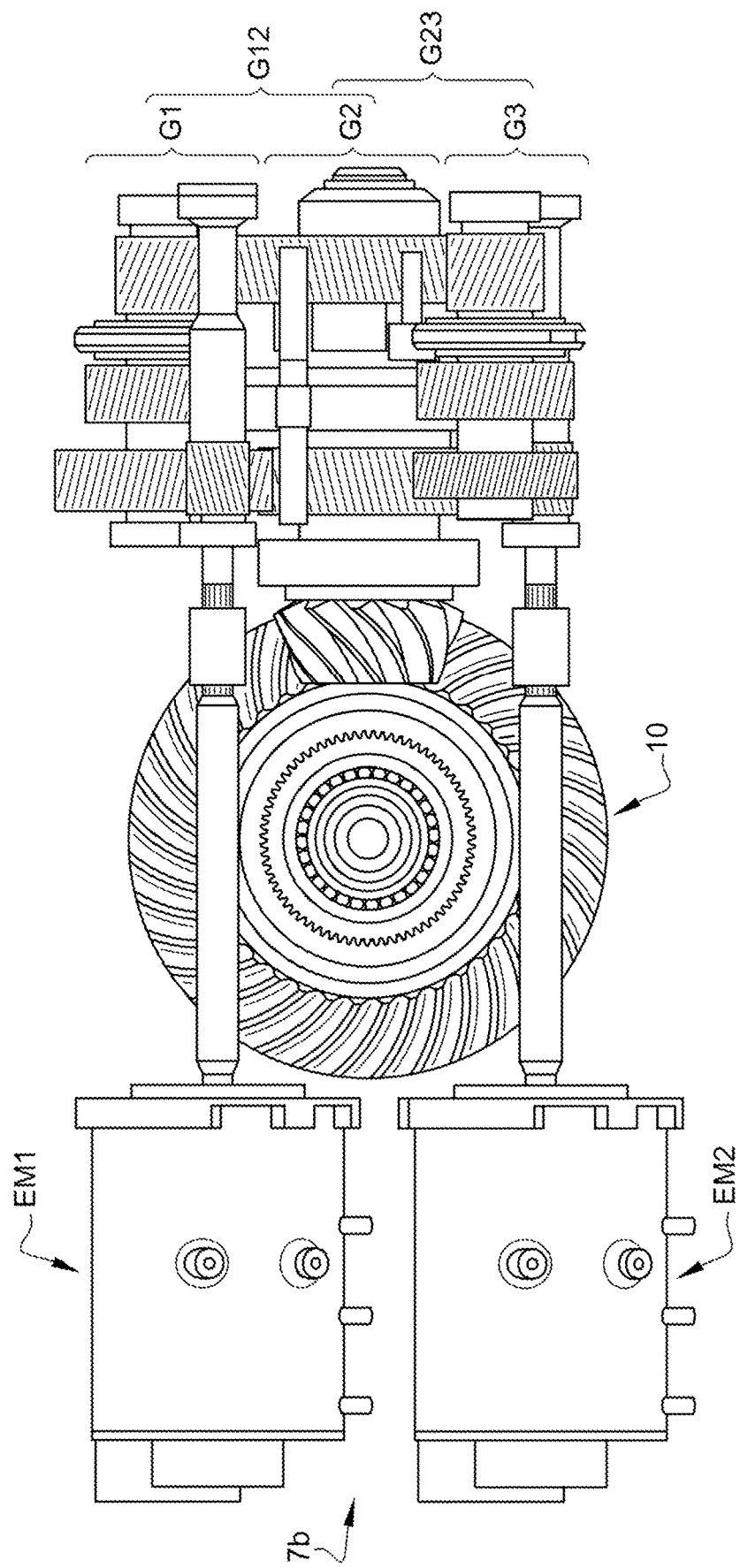
FIG. 13 is a perspective view of the electric powertrain integrated to the E-axle, said powertrain being according to the third embodiment of the invention.
Figure 14:
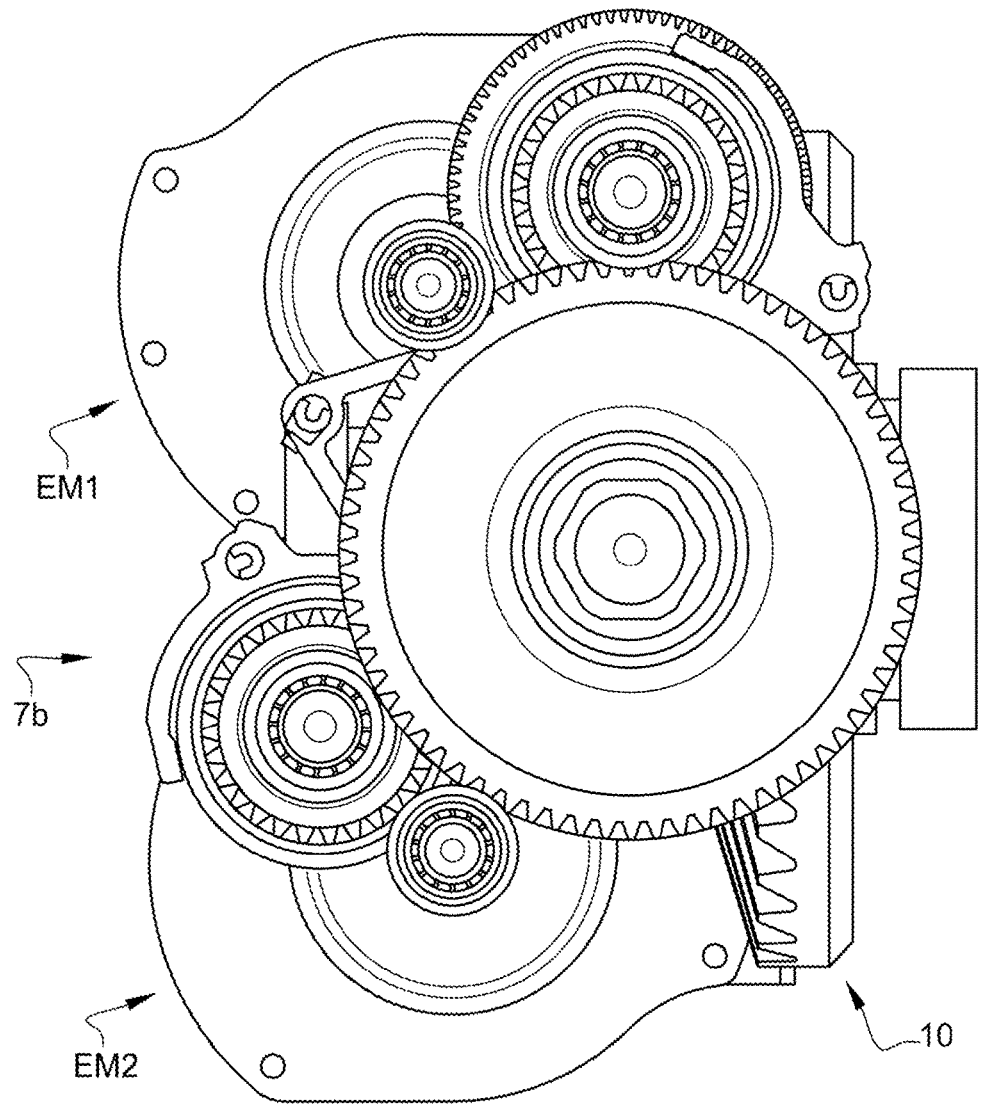
FIG. 14 is a front view of the powertrain integrated to the E-axle, said powertrain being according to the third embodiment of the invention.

As shown on FIG. 12, in a third embodiment, the invention relates to a kit of parts 3b for configuring an electric powertrain 7b for a vehicle 1 as illustrated in FIGS. 12 to 16. In this embodiment, the two electric motors EM1 and EM2 are arranged transverse relative to the the transversal direction of the vehicle, meaning that the axis of rotation of each motor EM1 and EM2 is perpendicular to the longitudinal direction of the vehicle. Accordingly, the powertrain 7b is said to be in a transverse configuration relative to the axle. The advantage of such transverse configuration is that it quite compact in the longitudinal side in comparison with a longitudinal configuration. To the contrary, a longitudinal arrangement requires less space in the transverse direction.

In this embodiment, EM1 linked to the first gear module G1, the second gear module G2 and EM2 linked to the third gear module G3 extend parallel to each other. The first gear module G1 is arranged in a first gear casing (not shown), the second gear module G2 is arranged in a second gear casing (not shown) and the third gear module G3 is arranged in a third gear casing (not shown). The first gear casing, the second gear casing and the third gear casing are adjacent. In an alternative embodiment, the first gear module G1, the second gear module G2 and the third gear module G3 are arranged in a common gear casing (not shown).

Preferably, the electric motors EM1 and EM2, the first gear module G1, the second gear module G2 and the third gear module G3 are encased inside the transmission housing. Alternatively, they could be outside of the transmission housing. In this case, the housing would include standard interfaces to assemble the electric motors EM1 and EM2.

Preferably, the electric motors EM1 and EM2 are powered by an electric power source, such as at least one battery or fuel cells, which are attached to another part of the vehicle, such as the chassis.

Besides, the crown wheel 12 and the output gear 46 are conical gears (also called bevel gear). In addition, the first secondary gear 41 is arranged between the second secondary gear 42 and the output gear 46 and gear 42 is between gears 41 and 43, meaning that the output gear 46 is typically arranged at the end of shaft 44. This specific configuration is particularly suitable to arrange another coupling element (not shown) between gears 42 and 43, as mentioned above.

Figure 15:
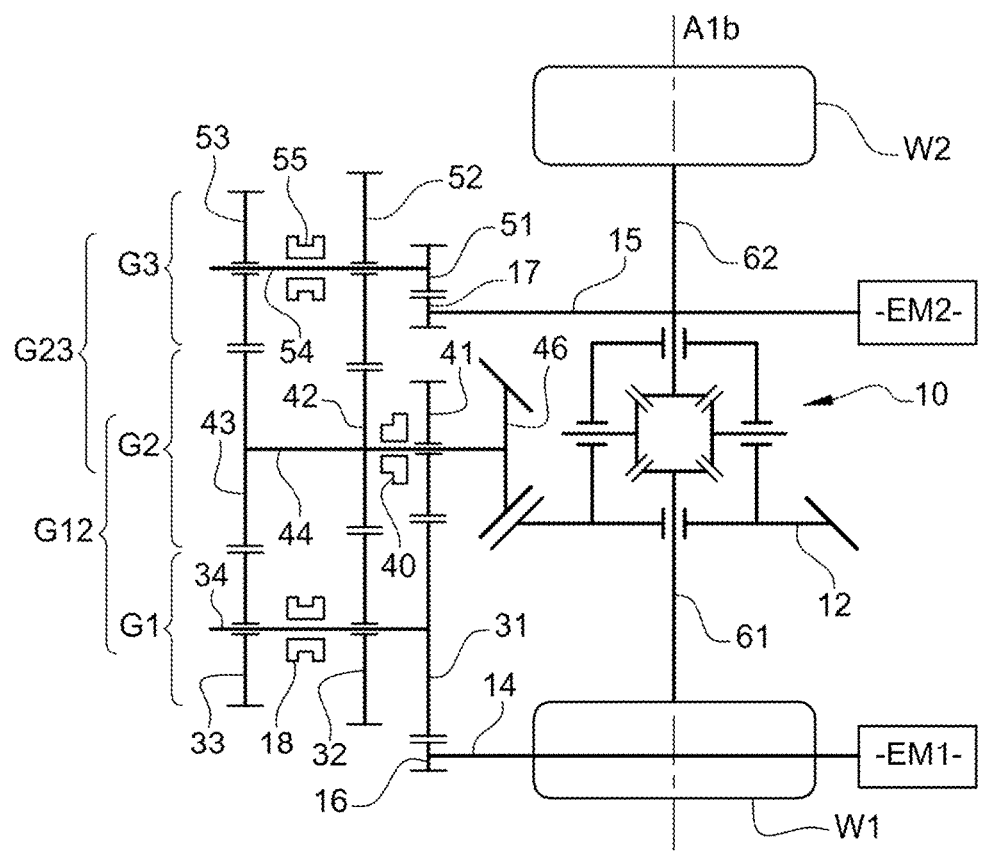
FIG. 15 is a schematic representation of the electric powertrain according to the third embodiment.

For the rest, the arrangement of the transmission represented on FIG. 15 is identical to that of FIGS. 1-11.

Figure 16:
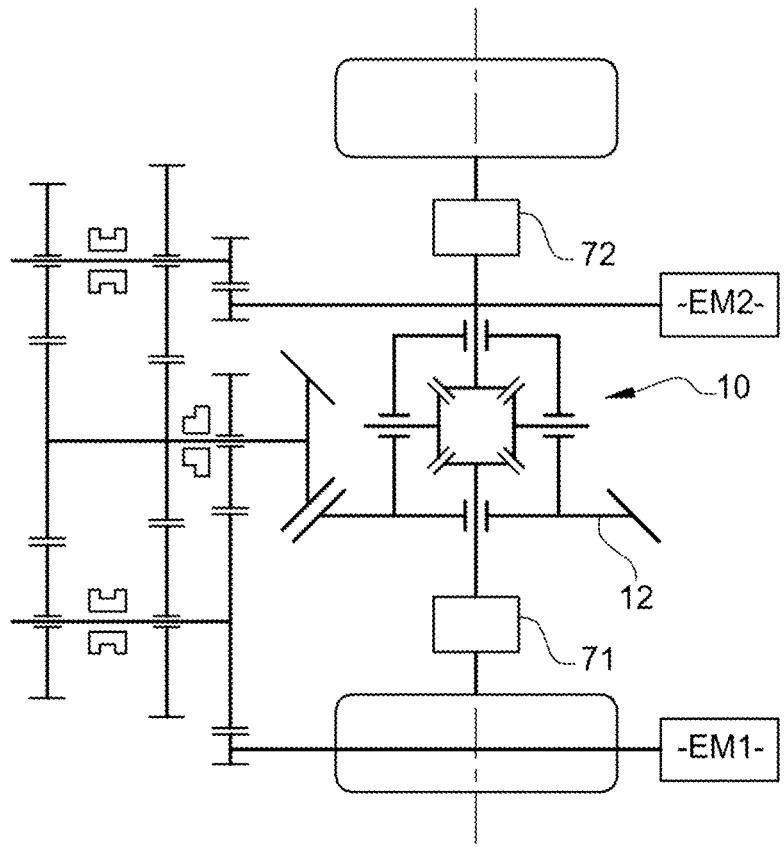

FIG. 16 shows the addition of hub reductions 71, 72 such as planetary gear train or any other reduction type. This hub reductions 71, 72 allow an increase of overall ratio from EM1 and/or EM2 to the wheels W1, W2 and consequently increase the available torque for the vehicle 1. Furthermore, the hub reductions 71, 72 can be used to decrease the bevel set crown wheel 12 diameter and thus increase vehicle ground clearance. This could be an interesting feature for an off road vehicle for instance.

FIG. 17 shows all possible combinations provided by all the electric powertrain 7, 7a and 7b. On this figure, the column "cruise gear" represents the engagement status of the first coupling member 40. When the "cruise gear" is engaged, the second coupling member 18 (and the coupling member 55, if any) is or are preferably in neutral position. However, in a variant, the coupling member 55 could be engaged in the first or second position while the cruise gear is engaged, i.e. while the first coupling member 40 is in engaged state.

The combination 12 in FIG. 17 allows a mechanical disconnection between vehicle wheels and electric motors. It can be used in downhill conditions for instance to avoid electric energy recuperation from the motors to the battery when this is not needed. It could also be used to avoid parasitic losses between all the elements of the electric powertrain and consequently allows energy saving. A full neutral position also allows to tow the truck in case of an unplanned stop since truck are usually tow with the driving wheel still touching the ground and rotating.

Advantageously, EM2 or EM1 is controlled by a control device (not shown) so as to provide an additional power during gear changes of the transmission element G12 or G23, respectively, so as to fully compensate for the power loss inherent in the gear change. EM2 and EM1 can be controlled simultaneously or independently from each other. This configuration corresponds to a full powershift mode.

Preferably, the transmission ratios of gearbox G23 are different from that of gearbox G12. Typically, the first speed ratio of G12 ("EM1 gear 1") is lower than the first speed ratio of G23 ("EM2 gear 2"), the first speed ratio of G23 ("EM2 gear 2") is lower than the second speed ratio of G12 ("EM1 gear 3") and the second speed ratio of G12 ("EM1 gear 3") is lower than the second speed ratio of G23 ("EM2 gear 4"). The third speed ratio of G12, or "gear cruising ratio", is lower than the second speed ratio of G23 ("EM2 gear 4").

All in all, the two gearboxes G12 and G23 form together a multi-input transmission, capable of selectively transmitting the torque of E-motor EM1 and the torque of E-motor EM2 (as inputs of the transmission) to the wheels, typically through the differential 10 (as output of the transmission).

To configure an electric powertrain, a vehicle manufacturer can in a step A) select an electric powertrain configuration depending on the vehicle, said configuration being chosen among:
1. a first configuration wherein the electric powertrain comprises a transmission unit including EM1,
2. a second configuration wherein the electric powertrain comprises a transmission unit including EM1 and EM2,
3. a third configuration wherein the electric powertrain comprises a transmission unit including EM2.

In a step B), the vehicle manufacturer can assemble the electric powertrain selected in step A) using the corresponding kit of parts.

It is to be understood that the present invention is not limited to the embodiments described above and illustrated in the drawings; rather, the skilled person will recognize that many changes and modifications may be made within the scope of the appended claims. The kit of parts of the present invention are at the disposal of the vehicles manufacturers to select and adapt and configure an electric powertrain depending on the vehicle. Thus, the productivity is improved and the cost of production decreases.

The invention claimed is:

1. An electric powertrain for a vehicle, the electric powertrain being configured to provide electric propulsion of the vehicle, the electric powertrain comprising:
   a transmission unit including a first electric motor, a second electric motor, a differential and a gearbox comprising a first gear module, a second gear module and a third gear module,
   the first electric motor being linked to the first gear module including a primary shaft on which are arranged a first primary gear, a second primary gear and a third primary gear,
   a secondary shaft being linked to the second gear module including a secondary shaft on which are arranged a first secondary gear that is meshing with the first primary gear, a second secondary gear meshing with the second primary gear and a third secondary gear meshing with the third primary gear,
   the second electric motor being linked to the third gear module including a tertiary shaft on which are arranged a first tertiary gear that does not mesh with any secondary gear, a second tertiary gear that is meshing the second secondary gear and a third tertiary gear that is meshing the third secondary gear, said second electric motor comprising a motor shaft on which is arranged a rotational gear meshing the first tertiary gear, said first secondary gear, said second secondary gear and said third secondary gear being adjacent,
   the differential being shared by both electric motors,
   said electric powertrain being such that the first electric motor linked to the first gear module, the second gear module, and the second electric motor linked to the third gear module extend parallel to each other.

2. An electric powertrain for a vehicle according to claim 1, wherein the first gear module is arranged in a first gear casing, the second gear module is arranged in a second casing and the third gear module is arranged in a third gear casing.

3. An electric powertrain for a vehicle according to claim 2, wherein the first gear casing, the second gear casing and the third gear casing are adjacent.

4. An electric powertrain for a vehicle according to claim 1, wherein the first gear module, the second gear module and the third gear module are adjacent and are arranged within a common casing.

5. An electric powertrain for a vehicle, the electric powertrain comprising:
- a transmission unit including a second electric motor, a differential and a gearbox comprising a second gear module and a third gear module,
- a second gear module including a secondary shaft on which are arranged a second secondary gear and a third secondary gear,
- the second electric motor being linked to the third gear module including a tertiary shaft on which are arranged a first tertiary gear that does not mesh with any secondary gear, a second tertiary gear that is meshing the second secondary gear and a third tertiary gear that is meshing the third secondary gear, said second electric motor comprising a motor shaft on which is arranged a rotational gear meshing the first tertiary gear, said second tertiary gear and said third tertiary gear being adjacent,
- the differential being linked to the second electric motor, said electric powertrain being such that the second gear module and the second electric motor linked to the third gear module extend parallel to each other.

6. An electric powertrain for a vehicle according to claim 5, wherein the second gear module is arranged in a second gear casing and the third gear module is arranged in a third gear casing.

7. An electric powertrain for a vehicle according to claim 6, wherein the second gear casing and the third gear casing are adjacent.

8. An electric powertrain for a vehicle according to claim 4, wherein the second gear module and the third gear module are adjacent and are arranged within a common casing.

9. An electric powertrain for a vehicle according to claim 1, wherein the electric powertrain comprises a control device configured to control the first and/or the second electric motors.

10. An electric powertrain for a vehicle according to claim 1, wherein the electric powertrain comprises at least one hub reduction.

11. Method for configuring an electric powertrain for a vehicle, said method comprising the following steps:
A, selecting an electric powertrain configuration depending on the vehicle, said configuration being chosen among:
  1. a first configuration wherein the electric powertrain comprises:
  - a transmission unit including a first electric motor, a differential and a gearbox comprising a first gear module, a second gear module and a third gear module,
  - the first electric motor being linked to the first gear module including a primary shaft, on which are arranged a first primary gear which is fixed in rotation with respect to the primary shaft, a second primary gear and a third primary gear,
  - a second gear module including a secondary shaft on which are arranged a first secondary gear that is meshing with the first primary gear, a second secondary gear meshing with the second primary gear and a third secondary gear meshing with the third primary gear,
  - a differential linked to the first electric motor,
said electric powertrain being such that the first electric motor linked to the first gear module, and the second gear module extend parallel to each other,
B. assembling the electric powertrain.

12. A vehicle, electric or hybrid, comprising an electric powertrain according to claim 1.

* * * * *